United States Patent

Banon

[11] Patent Number: 5,066,880
[45] Date of Patent: Nov. 19, 1991

[54] PERMANENT MAGNET POLYPHASE SYNCHRONOUS MACHINE

[76] Inventor: Louis Banon, 27 Bd des Italiens, 75002 Paris, France

[21] Appl. No.: 503,963

[22] Filed: Apr. 4, 1990

[30] Foreign Application Priority Data

Apr. 4, 1989 [FR] France ............................ 89 04414

[51] Int. Cl.⁵ .......................................... H02K 21/12
[52] U.S. Cl. ................................... 310/156; 310/162; 310/179; 310/258; 310/261
[58] Field of Search ............... 310/162, 163, 164, 165, 310/156, 261, 254, 258, 179, 184, 208, 218

[56] References Cited

U.S. PATENT DOCUMENTS

| | | |
|---|---|---|
| 3,242,364 | 3/1966 | Johnson . |
| 4,336,649 | 6/1982 | Glaser . |
| 4,658,167 | 4/1987 | Popow et al. ........................ 310/156 |
| 4,700,097 | 10/1987 | Kawada et al. ..................... 310/162 |
| 4,709,179 | 11/1987 | Banon et al. ....................... 310/156 |

FOREIGN PATENT DOCUMENTS

| | | |
|---|---|---|
| 0198986 | 10/1986 | European Pat. Off. . |
| 0333869 | 9/1989 | European Pat. Off. . |
| 2062486 | 12/1970 | Fed. Rep. of Germany . |
| 17767 | 11/1913 | France . |
| 994928 | 11/1951 | France . |
| 1184491 | 7/1959 | France . |
| 1214249 | 4/1960 | France . |
| 1272067 | 8/1961 | France . |
| 57-52335 | 3/1982 | Japan . |
| 2075274 | 11/1981 | United Kingdom . |

OTHER PUBLICATIONS

Siemens Review, XLIII, 1976, No. 6, pp. 248–254, Erlangen, Germany, W. Volkrodt; "Machines of Medium–High Rating . . . Field".

*Primary Examiner*—R. Skudy
*Attorney, Agent, or Firm*—Burns, Doane, Swecker & Mathis

[57] ABSTRACT

The permanent magnet synchronous electrodynamic machine comprises a rotor (5) of the flux concentration type including a shaft or hub (15) made from a non-magnetic material on which rest parallel-sided radial permanent magnets (12) between which are disposed polar pieces (14) made from a ferro-silicon magnetic sheet, and a stator (2) comprising a frame made from ferro-silicon magnetic sheet in which are formed a plurality of semi-closed notches (10) delimited by a stator yoke (11) and receiving induction coils (9), the rotor defining with the rotor (5) an air gap (6). The magnets (12) are of the ferrite type and the ratio r1 of the height of the section of a magnet (12) through which the induction flux passes divided by the bore diameter of the air gap is between 0.19 and 0.27.

7 Claims, 2 Drawing Sheets

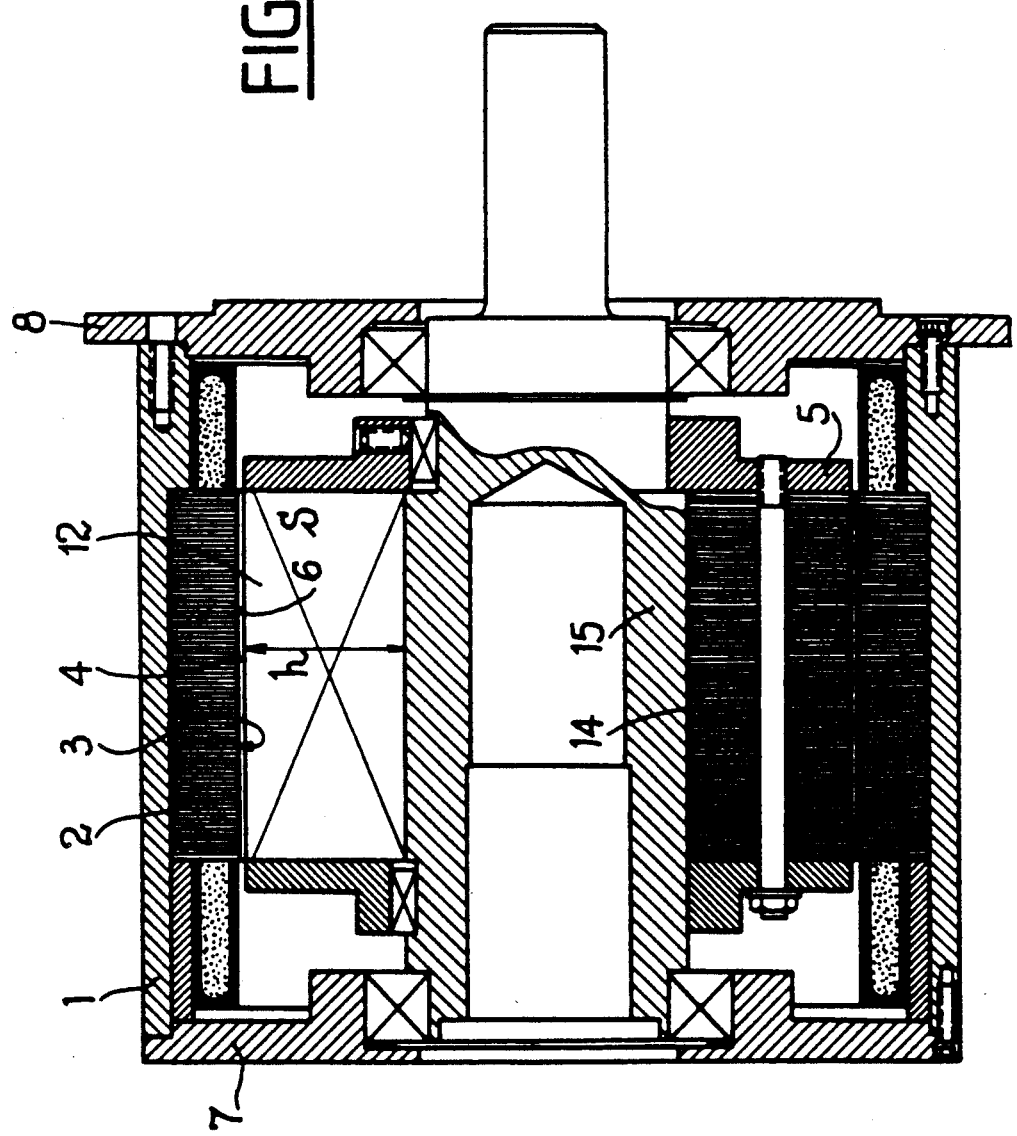

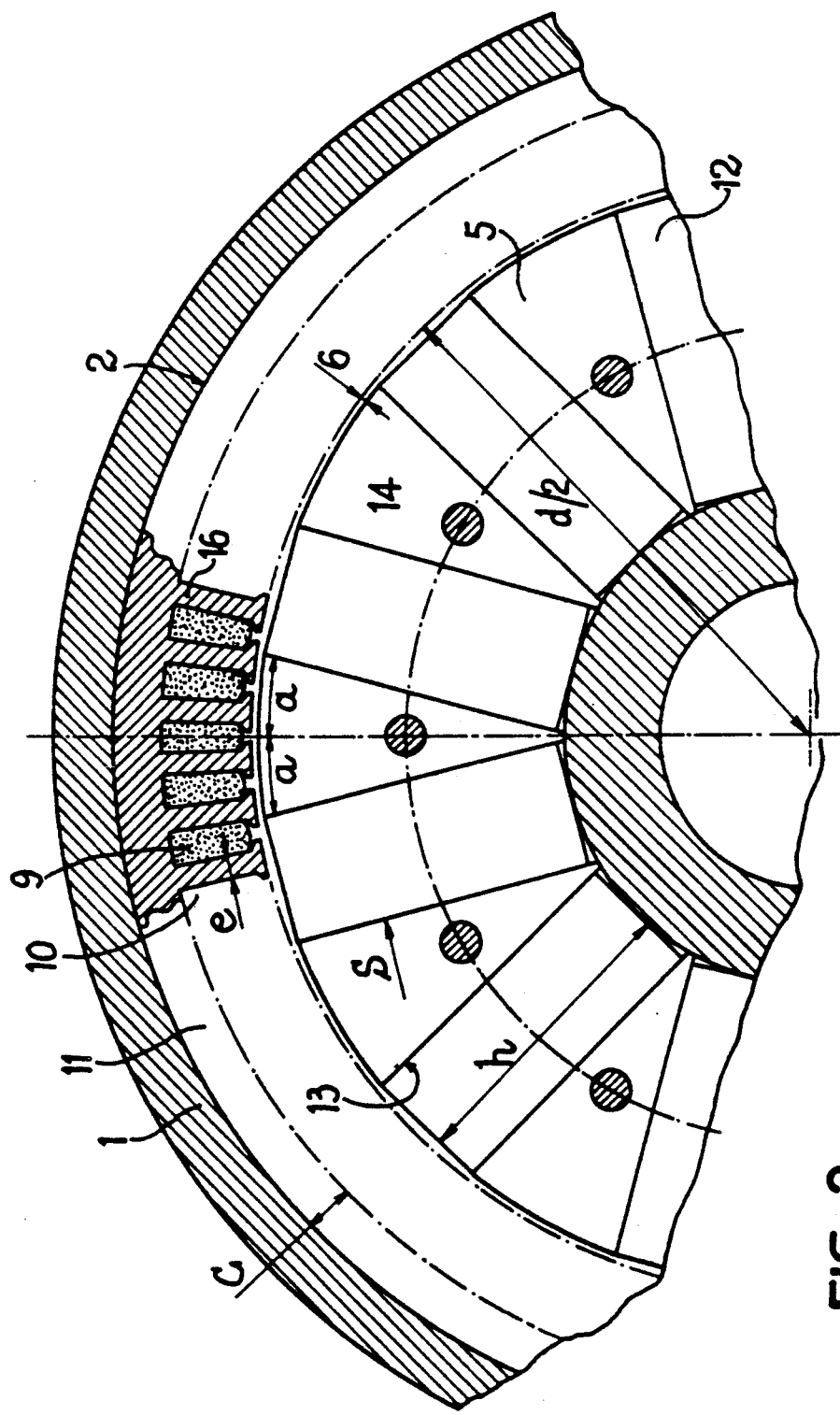
FIG._2

PERMANENT MAGNET POLYPHASE SYNCHRONOUS MACHINE

The present invention relates to a permanent magnet synchronous electrodynamic machine comprising a rotor of the concentrating flux type and including a shaft or a hub made from a non-magnetic material on which rest radial parallel-sided permanent magnets between which are disposed the polar pieces made from a ferro-silicon magnetic sheet, and a stator comprising a frame made from ferro-silicon magnetic sheet metal in which are formed a plurality of semi-closed notches delimited by a stator yoke and receiving induction coils, the stator and rotor defining an air gap.

In the previously-described machines, for the purpose of obtaining a high mass torque, there are employed rotors equiped with so-called high energy magnets of rare earth type (samarium cobalt and more recently neodymium-iron) which sometimes employ in the best cases a magnetized rotor structure known in the art, namely, a structure having a flux concentration. This manner of proceeding is suitable for relatively low torque machines rotating at high speeds and therefore driving loads through speed reducers.

However, when it is desired to effect direct driving of loads without speed reducers, for a given power, the torque required in the motor is much higher than in the motor-speed reducer arrangement. It is therefore necessary to employ machines of large size in which the use of rare earth magnets of high specific price results in a very high cost of the machine. The high cost dissuades the user from using a direct drive arrangement, whereas technically, for reasons of clearance, stiffness, increase in the control band-pass, and simplicity of the mechanical realization, the direct drive is desirable.

The invention relates to the construction of permanent magnet synchronous machines having a high mass and volume torque, rotating at low speed, which permits direct drive.

An object of the invention is to obtain high ratios of flux concentration so as to have with magnets of ferrite type a issuing flux from the rotor which is close to that obtainable with high energy rare earth magnets. Furthermore, these high ratios of concentration of flux provides a stator induction close to saturation induction. This is made possible by:

the use of rotors of large diameter (greater than 100 mm) compatible to the user with the required torques (from 25 Nm (Newton meters) to several hundred Nm);

the use of flux concentrating rotors having a large number of poles; the magnetic losses however remaining low owing to the low speeds of rotation required by the direct drive (a few rps, usually less than 3 rps).

The ferrite magnets are of interest from the point of view of cost owing to the fact that their specific price is on the order of 1/50th of that of present samarium-cobalt magnets, and 1/25th of that which would be reached after stabilization by the new high energy neodymium-iron rare earth magnets (which present high field loss coefficients with increase in temperature). Consequently, the solution proposed by the invention is competitive with respect to the conventional solutions employing motor-speed reducers.

Note that the use of magnets of the high energy type would result in a notable increase in cost with a given structure but would not provide a notable gain in mass torque. This is due to the flux concentration coefficient being lower than that employed for the ferrites, and the magnetic sheets employed for the stator magnetic circuit saturating magnetically around an induction of 2 teslas, which is already reached with the machine according to the invention.

To obtain these results, the invention provides a machine wherein the magnets are of the ferrite type and the ratio r1 of the height of the section of a magnet through which the induction flux passes divided by the bore diameter of the air gap is between 0.19 and 0.27.

According to another feature of the invention, the ratio r2 of the section of a magnet through which the induction flux passes divided by the length of a peripheral polar semi-arc of the rotor between the confronting surfaces of two consecutive magnets, also known as the flux concentration ratio, is between 3.1 and 3.9. According to a further feature, the ratio r3 between the product of the number of stator teeth multiplied by the thickness of a stator tooth between two consecutive notches, divided by $4 \times P$ times the length of a peripheral polar semi-arc of the rotor between the confronting surfaces of two consecutive magnets, P being the number of pairs of poles of the machine, is between 0.75 and 0.95.

According to a further feature, the ratio r4 of $4 \times P$ times the radial thickness of the stator yoke divided by the product of the number of stator teeth separating the stator notches by the thickness of a stator tooth between two consecutive notches, is between 0.60 and 0.75.

There has therefore just been defined a series of dimensional ratios r1 to r4 which permit from an initial choice of a bore diameter determining all of the dimensions of the machine for obtaining a maximum mass torque with the use of ferro-silicon magnetic sheets and ferrite magnets. This series of optimum ratios results in a rotor structure having quasi-adjoining magnets at their lower end.

The invention will now be described with reference to the accompanying drawings in which:

FIG. 1 is an axial sectional view of a synchronous electrodynamic machine.

FIG. 2 is a diagrammatic cross-sectional view of the rotor and the frame of an electrodynamic machine constructed in accordance with the teaching of the present invention.

There is shown in FIG. 1 an axial sectional view of a synchronous motor.

The motor comprises mainly a housing 1 in which is mounted a stator 2 whose inner peripheral wall 3 cooperates with the outer peripheral wall 4 of a rotor 5 mounted in the housing 1 so as to define therebetween an air gap 6. The rotor 5 is rotatively mounted in the housing 1 by two bearing elements 7 and 8 each including a rolling bearing.

The stator 2 shown in FIGS. 1 and 2 comprises a principal stator winding or induction coils 9 disposed in the semi-closed notches 10 delimited by a stator yoke 11.

The rotor 5 also comprises magnets, which can be permanent magnets, 12 mounted in radial notches 13.

In the present invention, the magnetic sheets in which are formed the polar pieces 14 and the yoke 11 are ordinary sheets of ferro-silicon alloy.

Each of the magnets of the rotor has a generally rectangular parallel-sided shape and bears against the non-magnetic hub or shaft 15.

The magnets employed are ferrite magnets. In the illustrated embodiment, the magnets are each formed by a plurality of parallel-sided elementary magnets 12 which are assembled together for ease of manufacture.

Each magnet is tangentially magnetized, i.e., the flux lines issuing from a lateral section S of a magnet are substantially perpendicular to the radii of the rotor. According to the invention, and in order to achieve maximum magnetic saturation, the electrodynamic machine is so dimensioned that the ratio r1 defined by the formula $$r1 = h/d$$

in which:
h is the radial height of the section S of a magnet 12 through which the induction flux passes,
d is the "bore diameter" or the mean diameter of the rotor 5 plus air gap 6 of the electrodynamic machine, and the value of the ratio r1 is between 0.19 and 0.27 to within constructional details.

According to another feature of the invention, the ratio r2 defined by the formula $$r2 = h/a$$

in which:
a is the length of an outer peripheral polar semi-arc of the rotor 5 between the confronting surfaces S of two consecutive magnets 12, h is defined as above and the value of the ratio r2 is between 3.1 and 3.9.

According to a further feature of the invention, the ratio r3 defined by the formula $$r3 = \frac{n \times e}{4 \times P \times a}$$

in which,
n is the number of stator teeth 16 between the stator notches 10,
e is the thickness of a stator tooth 16 between two consecutive stator notches 10,
P is the number of pairs of magnetic poles, a is defined as above and the value of the ratio r3 is between 0.75 and 0.95.

According to a preferred embodiment, the number of pairs of poles is equal to 6, the number of stator teeth 16 is equal to 72.

According to a further feature of the invention, the ratio r4 defined by the formula $$r4 = \frac{4 \times P \times c}{n \times e}$$

in which:
c is the radial thickness of the stator yoke 11 delimiting the stator notches 10, while P, n and e are defined as above and the value of the ratio r4 is between 0.60 and 0.75.

I claim:
1. An apparatus comprising:
a flux concentration rotor including
a shaft made of a non-magnetic material,
parallelopipedal radial disposed permanent magnets adjacent said shaft through which induction flux passes, and
polar pieces disposed between said magnets; and a stator, having a bore diameter, including
a frame,
a plurality of semi-closed notches provided in said frame,
a stator yoke delimiting said notches, and
induction coils received in said notches, said stator and said rotor defining an air gap, said apparatus being constructed in accordance with a first ratio r1 defined by the equation

$$r1 = h/d$$

wherein:
h is a height of a section of one of said magnets, and
d is a bore diameter of said stator,
the value of said first ratio r1 being between 0.19 and 0.27.

2. The apparatus according to claim 1, said apparatus being constructed in accordance with a second ratio r2, defined by the equation $$r2 = h/a$$

wherein:
h is the height of said section of one of said magnets, and
a is a peripheral polar semi-arc of said rotor, said semi-arc defined between confronting surfaces of two consecutive magnets,
the value of said second ratio r2 being between 3.1 and 3.9.

3. The apparatus according to claim 1, said apparatus being constructed in accordance with a third ratio r3 defined by the equation $$r3 = \frac{n \times e}{4 \times P \times a}$$

wherein:
n is a number of stator teeth formed between said notches,
e is a thickness of one of said stator teeth,
P is a number of pairs of said polar pieces, and
a is a peripheral polar semi-arc of said rotor, said semi-arc defined between confronting surfaces of two consecutive magnets,
the value of said third ratio r3 being between 0.75 and 0.95.

4. The apparatus according to claim 1, said apparatus being constructed in accordance with a fourth ratio r4 defined by the equation $$r4 = \frac{4 \times P \times c}{n \times e}$$

wherein:
P is a number of pairs of said polar pieces,
c is a radial thickness of said stator yoke,
n is a number of stator teeth formed between said notches, and
e is a thickness of a stator tooth between two consecutive notches,
the value of said fourth ratio r4 being between 0.60 and 0.75.

5. The apparatus according to claim 1, wherein a number of pairs of said polar pieces is 6.

6. The apparatus according to claim 1, wherein said polar pieces, said frame and said stator are made from ferro-silicon magnetic sheet.

7. The apparatus according to claim 1, wherein said magnets are ferrite type magnets.

* * * * *